May 19, 1959            A. G. THOMAS            2,887,640

AUTOMATIC CONTROL DEVICES

Original Filed March 29, 1955

Albert G. Thomas    INVENTOR.

May 19, 1959     A. G. THOMAS     2,887,640
AUTOMATIC CONTROL DEVICES

Original Filed March 29, 1955     2 Sheets-Sheet 2

Albert G. Thomas
INVENTOR.

United States Patent Office 2,887,640
Patented May 19, 1959

2,887,640

AUTOMATIC CONTROL DEVICES

Albert G. Thomas, Butler, Pa., assignor to Industrial Controls Corporation, Chattanooga, Tenn., a corporation of Tennessee Original application March 29, 1955, Serial No. 497,755. Divided and this application February 19, 1957, Serial No. 641,224

3 Claims. (Cl. 318—138)

This invention relates to motor speed control systems. This application is a division from my co-pending application, Serial Number 497,755, filed March 29, 1955, now abandoned. The step motor indicated in this system is similar to the motor described in my issued U.S. Patent Number 2,774,922.

Industry and other possible users have long needed a motor or motor control system which can be accurately controlled in speed without excessive complication or cost. Many attempts have been made to solve this problem but the proffered solutions have left much to be desired. In most cases the speed control is only approximate, within a few percent or more, and costs have been high. Various attempts have been made to provide motor speed control systems by driving direct current generators with alternating current or other power sources and then attempting to control the speeds of direct current motors connected with the direct current generators. This is a very round-a-bout system requiring much expensive equipment and is only partially successful in producing the desired results.

I have devised a motor control system which is relatively simple, highly accurate, and which can be made and sold at reasonable price.

An object is to provide an accurate motor speed control system which is widely applicable to various speed control problems and which can be set to provide predetermined speeds.

Another object is to provide a motor speed control system by which the speed can be readily changed.

A further object is to provide a motor speed control system which will control motor speed very accurately.

Other objects will be evident in the following description.

Figure 2:
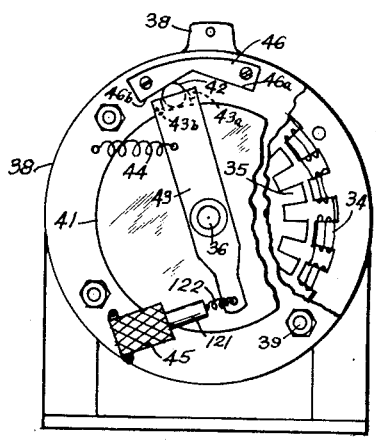
Figure 2 is an end view, as seen from the right of the motor shown in Figure 1.

The motor 28 comprises three stator sections 31, 32, and 33 having the same number of inwardly directed radially aligned teeth or poles 34 as shown in Figure 2. The inner circumferential width of these poles is preferably equal to the circumferential spacing between them. The rotor poles or teeth 35 are likewise equally spaced and outwardly radially directed. The circumferential width of these poles is substantially equal to the circumferential width of the stator poles. There are an equal number of stator poles and rotor poles in each of the three sections or phases of the motor.

Motor shaft 36 is rotatable in suitable bearings in end plates 37 and 38 which are clamped by bolts 39 and associated nuts against outer spacers 40 which are situated between the stator sections 31, 32, and 33, and between the end plates and outer stator sections 31 and 33. These spacers are bored so that bolts 39 may pass through them. There can be any desired number of clamping bolts but from four to eight are sufficient in most cases.

Hardened steel disc 41, having a relatively smooth rim, is fastened or keyed to the motor shaft and rotates with it. Hardened roller 42 is arranged in a cage extending from the arm 43 and may be brought into contact with either surface of inverted V cam 46 which is fastened to plate 38. This cam may also be hardened. Normally, tension spring 44, attached to arm 43 and to a pin on the frame or plate 38, urges arm 43 counterclockwise (as seen in Figure 2) about the motor shaft which supports it, so that roller 42 allows clockwise rotation of disc 41 but is pinched between cam 46 and disc 41 to lock the disc and rotor against rotation in counterclockwise direction. Solenoid 45 is attached to plate 38 and its armature is fastened to the lower end of arm 43, preferably by means of a stiff spring. When this solenoid is supplied with current through its winding, arm 43 is rotated clockwise, as viewed from the right, and roller 42 is moved over against the opposite inclined surface 46a of cam 46 and by means of a pinching action, prevents clockwise rotation of the disc and motor but allows counterclockwise rotation.

Each pole or each alternate pole of the three stator phases may be provided with respective windings 72, 73, and 74. The coils for each phase may be connected in series, series-parallel, or otherwise. A terminal of each phase winding is connected to positive line 49 and the other three terminals of windings 72, 73, and 74, are connected, respectively, with flexible leads 74a, 75, and 76 which are connected to the anodes of thyratrons 77, 78, and 79 through potential dropping resistors 80, 81, and 82.

Quenching condensers 83, 84, and 85 are connected between the anodes of the thyratrons as shown and serve to help extinguish any conducting thyratron when another is fired. The cathode of thyratron 77 is connected to negative line 86 through resistor 87 and the cathodes of thyratrons 78 and 79 are connected with negative line 86 through respective resistors 88 and 89. Bias sources 90, 91, and 92 are arranged with their negative poles connected with the respective grids of thyratrons 77, 78, and 79. These potential bias sources may be batteries, rectifiers, or the like, but will be termed "batteries" for convenience.

The positive pole of bias battery 90 is connected to the contact 97 of a three pole double throw relay comprising arms or armatures 99, 101, and 104 and actuating coil 106a. Armature 99 is normally held against contact 97 by a spring but is moved over against contact 98 when coil 106 is energized.

This armature is connected to an end of resistor 96, the other end of which is connected to the cathode of thyratron 79. Contact 98 is connected to contact 100 of the three pole double throw relay which includes armature 101 and other contact 102. Contact 100 is connected to the positive pole of battery 91. Armature 101 is connected to an end of resistor 94, the other end of which is connected to the cathode of thyratron 77. Armature 101 is normally held against contact 100 by the relay spring. Contact 102 is connected to contact 103 which is connected to the positive pole of bias battery 92. Armature 104, of the relay, is normally held against contact 103 and this armature is connected to an end of resistor 93. The other end of this resistor is connected to the cathode of thyratron 78. The other contact 105, of the relay, is connected to contact 97 and the positive pole of battery 90.

Relay coil 106a, when supplied with current, attracts armatures 99, 101, and 104 against respective contacts 98, 102, and 105. These relays may be made with flexible or wiping contacts so that the relay armatures touch contacts 98, 102, and 105 before contact with elements 97, 100, and 103 is broken. In this way the thyratrons are maintained under negative bias so that they will not be fired when the relay armatures are switched over by coil 106a. This coil will, of course, be placed in proper position to move the three armatures in the desired direction. The armatures may be physically tied together but may be insulated one from the other. Capacitances 106, 107, and 108 are connected between the cathodes of the thyratrons as indicated and serve to aid capacitances 83, 84, and 85 in quenching or extinguishing any conducting thyratron when any other one is fired. It is desirable to limit the capacity of the condensers 83, 84, 85 in order to reduce the circulating currents traversing the motor windings when one thyratron is fired and another is extinguished. These condensers or circulating currents tend to interfere with the normal magnetizing currents in windings 72, 73, and 74, and limit the speed and torque of the motor. I have found that by connecting the condensers 106, 107, and 108 in the cathode circuit, as illustrated, the capacitance of condensers 83, 84, and 85 can be reduced and better motor operation results. It is preferable to have the cathode-connected condensers 106, 107, and 108 of considerably larger capacitance than the anode-connected condensers 83, 84, and 85. As an illustration, in one step motor circuit I have used condensers of 7½ microfarads capacitance for the anodes and 24 microfarads for the cathodes. In some cases it is possible to eliminate the anode-connected condensers, using only the condensers connected between the cathodes.

Relatively small condensers 109, 110, and 111 are connected to conductor 112 and to respective relay armatures 99, 101, and 104. Resistor 113 is connected to negative line 86 and to conductor 112 and this resistor is in series with battery or other current source 114, the negative pole of which is connected to the cathode of electronic tube 115. The anode of this tube is connected to negative line 86. The grid of tube 115 is normally negatively biased, preferably to the point of cut-off by bias battery 116 which is connected to the cathode through resistor 117. This resistor is also connected in series with battery or other current source 118a and phototube 119a which may be of the multiplier type or otherwise. In using the word "phototube," I mean to include photo-transistors, or any light-sensitive, heat-sensitive, or radiation-sensitive device or component. Likewise I use the word "thyratron" to include transistors, ignitrons, or any suitable current control device.

The positive pole of battery 118a is connected to the anodes of all the phototubes, 119a to 133a inclusive. It is obvious that when phototube 119a is illuminated current from battery 118a will pass through resistor 117 in a direction to bias the grid of the tube 115 positively, the components being so chosen that this positive bias will be considerably higher than the opposing negative bias of battery 116. Therefore, if phototube 119a is briefly illuminated, tube 115 will momentarily become conductive and a pulse of current from battery 114 will be passed through resistor 113 and tube 115. This electrical pulse will be passed through small condensers 109, 110, 111, and will be applied to the grids of thyratrons 77, 78, and 79, through the relay armatures. These pulses are positive and tend to fire the thyrartons but the amplitude of the pulses is so chosen that only a thyrarton which has been prebiased by an associated tube is fired. Assume that tube 77 has been fired. Current from positive line 49 will then pass through motor windings 72 of phase I and through resistors 80 and 87 and line 86. The potential drop across resistor 80 will cause condenser 83 to be charged and the potential drop across resistor 87 will cause condenser 107 to be charged and also will provide a positive bias for the grid of thyratron 78 which is less than the negative bias from battery 91. A pulse of proper ampltitude applied to the three condensers 109, 110, and 111 will therefore fire only tube 78 and condensers 83 and 107 will cause tube 77 to be extinguished due to drop of anode potential. In similar manner current passing through winding 73, resistor 81, tube 78, and resistor 88 will bias the grid of tube 79 less negatively so that only this tube will be fired when another pulse is applied to condensers 109, 110, and 111. The charged condensers 85 and 106 will cause extinction of tube 78 when tube 79 is fired. In the same manner as described, the current traversing motor windings 74, resistor 82, tube 79, and resistor 89 will cause the grid of tube 77 to have less negative bias so that it will be fired when the next pulse is applied to condensers 109, 110, and 111. The condensers 84 and 108 will cause extinction of tube 79 when tube 77 is fired.

When motor stator windings 72 are energized, the rotor poles are magnetically pulled into alignment with the associated stator poles for that phase. Then if stator windings 73 are energized and windings 72 are deenergized, the positionally phased rotor poles of the second phase are magnetically pulled into alignment with the associated stator poles energized by windings 73. When tube 79 is then fired to energize stator windings 74 of the third phase, the windings 73 being deenergized due to extinction of tube 78, the positionally phased rotor poles of the third phase will be magnetically pulled into alignment with the associated stator poles which are magnetized by windings 74. Then, if the sequence of energization is repeated, the rotor may be caused to revolve in one direction, in steps.

When it is desired to reverse the direction of rotation of the rotor of motor 28, relay cell 106a is energized. Then relay armatures 99, 101, and 104 are quickly snapped over against respective contacts 98, 102, and 105 so that the order of firing the tubes of the ring circuit is reversed. In other words, the potential drop across resistor 87 will then apply a degree of positive bias to the grid of tube 79, the potential drop across resistor 88 will be applied to the grid of tube 77 and the potential drop across resistor 89 will be applied to the grid of tube 78. Therefore, if electrical pulses are applied to condensers 109, 110, and 111 as a result of sudden changes of potential across resistor 113, the tubes will be fired in reverse order so that the motor windings will be energized in reverse order 74, 73, 72, and the rotor will reverse in direction of rotation.

Relay coil 118 is connected in parallel with coil 106 so that relay armature 119 will be quickly snapped against contact 120 simultaneously with the movement of armatures 99, 101, and 104. Positive line 49 is connected with contact 120 and armature 119 is connected with one terminal of solenoid 45, the other terminal of which is connected with negative line 86. When, therefore, coil 118 attracts armature 119 and contact 120 is struck thereby, solenoid 45 is quickly supplied with current and solenoid plunger 121 (Figure 2) is pulled into the solenoid, causing arm 43 to be rotated clockwise so that the cage 43a attached to arm 43 carries roller 42 over against inclined surface 46a of hardened cam 46. This roller will therefore lock disc 41 and the rotor against rotation in clockwise or forward direction but will allow rotation in the reverse direction. Stiff spring 122 connecting the solenoid plunger and arm 43 allows the plunger to be seated and yet maintains sufficient holding force on the arm and roller. When solenoid 45 is deenergized, tension spring 44 attached to the arm and plate 38 pulls the arm and roller back so that the roller is in contact with cam surface 46b as shown. Under this condition disc 41 and the rotor can be rotated forward or clockwise but not in the reverse direction.

The locking or braking action is employed to provide stable operation of the step motor. Without it the rotor tends to oscillate about an aligned position, for any phase, and erratic behavior results. With the one way brake however, which can be set for either direction, the motor can be operated reliably and at faster speed. The motor can be operated as a synchronous motor without the brake if the phase windings are energized with rythmic timing but difficulty is experienced in reversing the motor if the brake is not used and is making quick changes of speed.

The positive and negative lines 49 and 86 are connected to a suitable source of direct current such as a motor-generator, rectifier or the equivalent. Transistors, magnetic amplifiers or the like may be used instead of thyratrons to control currents traversing the motor windings.

Figure 1:
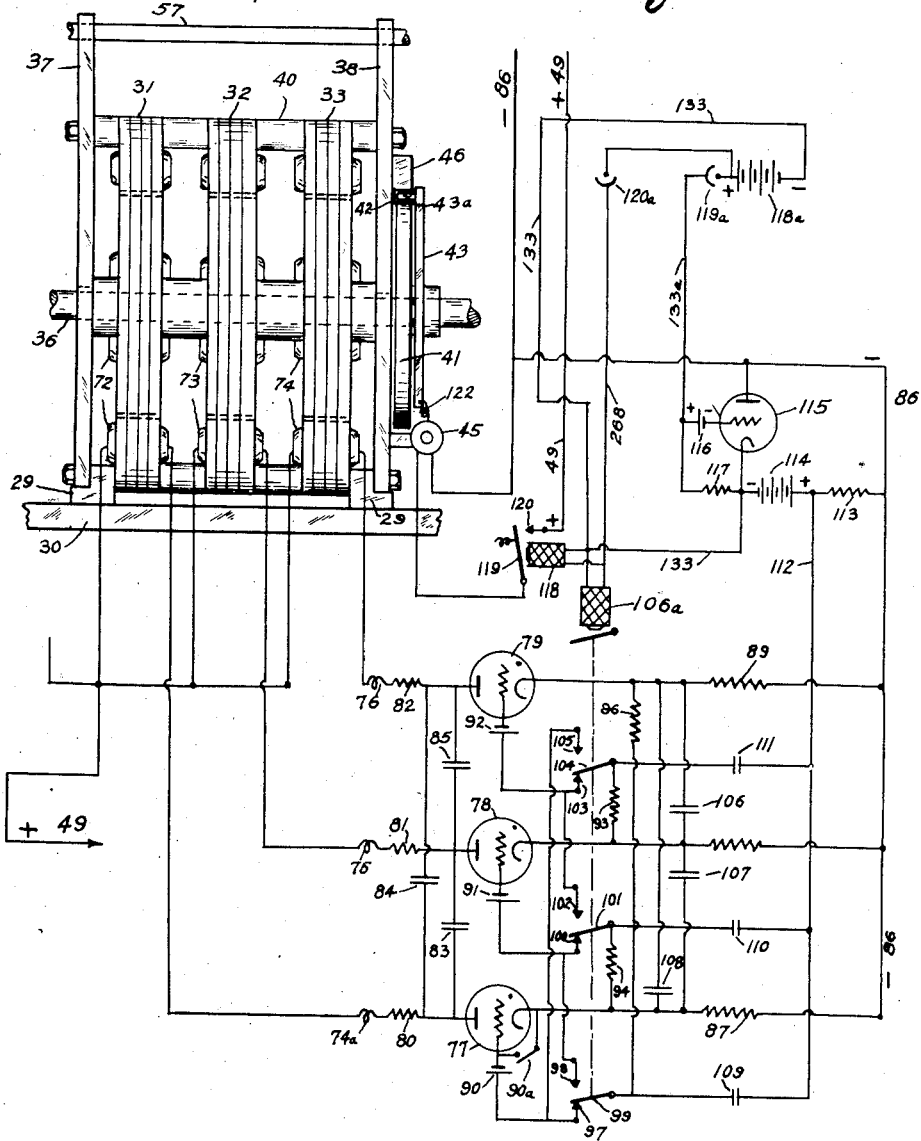
Figure 1 is a front elevation of a step motor, and associated control circuit. Parts shown in the parent case and not essential to the operation of the motor are omitted or shown broken away.
Figure 3:
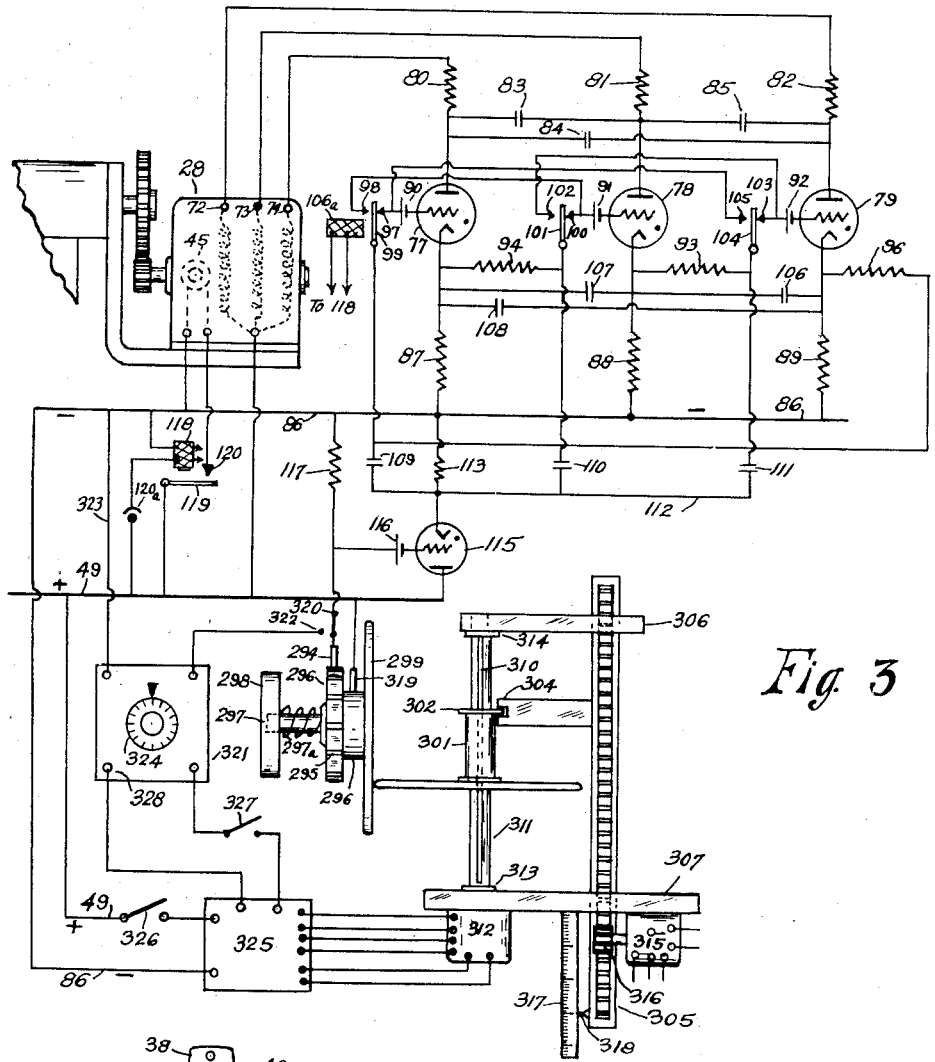
Figure 3 shows a motor system and associated circuits and components for providing variable predetermined motor speeds.

In Figure 3 like parts are given like numerals as in Figure 1. The connections of thyratrons 77, 78, and 79 with motor 28 are as shown before but in this case the clutches are not included. The motor is designed as previously described and brake-operating solenoid 45 is shown to the left of the motor as indicated. One terminal of this solenoid is connected to negative line 86 and the other solenoid terminal is connected to relay contact 120 which is struck by relay armature 119 when coil 118, in series with positive line 49 and negative line 86 and photocell 120a, is energized with current due to illumination of the photocell. When armature 119 is in contact with element 120, solenoid 45 is energized since it is then connected in series with positive line 49 and negative line 86. Energization of the solenoid sets the brake for reverse rotation in similar manner to that described in connection with Figure 1.

The circuit components shown in Figure 3 serve the same purposes as similarly numbered components in Figure 1. In Figure 3, however, battery 114 is eliminated and resistor 113 is connected in series with tube 115 between positive line 49 and negative line 86, and an end of the resistor is connected to condenser line 112 as indicated. Grid resistor 117 is connected at one end to negative line 86 and the other end to the positive terminal of bias battery 116 which normally biases tube 115 negatively to the point of cut-off. The anode of battery 116 and resistor 117 are also connected to brush 294 which is in contact with commutator 295 having coaxial slip ring 296 electrically connected with the copper or other conductive commutator segments 296. Brush 319, connected to line 49, is in contact with slip ring 296. The commutator and slip ring are axially bored and are rotatable on stub shaft 297 screwed or otherwise fastened in fixed support 298. Shaft 297 extends from support 298 and may have a flanged head fitted into a recess in the outer face of slip ring 296. Compression spring 297a may be placed around shaft 297 to urge the commutator and disc to the right.

Disc 299, of metal, plastic, or the like, is fastened by screws to the face of slip ring 296 coaxially therewith but if of metal is electrically insulated from the slip ring. Relatively thin disc 300 is integral with or is fastened to spool 301 having flange 302. This flange is fitted into notch 303 in bar 304 attached to rod or bar 305 which is slidable in suitable bearings in fixed supports 306 and 307 which may be a part of the frame of the machine or other device. Bar 305 may be of rectangular cross section or may be keyed to prevent it from turning. Rack 308 is integral with or attached to bar 305 and may pass through suitable slots in the bearings.

Key 309 extends inwardly from spool 301 and is slidable in elongated slot or groove 310 in shaft 311 which is rotatable in bearings in supports 306 and 307. Shaft 311 is connected with the shaft of motor 312 which is fastened to support 307. Collar 313 may be attached to the shaft to prevent end play in one direction and collar 314 will prevent end play in opposite direction. Motor 312 may be a step motor or a constant speed synchronous motor and may be connected to shaft 311 by means of a gear system instead of directly, as shown. Spool 301 is slidable on shaft 311 and is turned by means of key 309. Step motor 315 is similar in construction to motor 28 but may be of smaller size for most purposes. Pinion 316 is attached to the shaft of motor 315 and is meshed with rack 308 so that the rack and bar 304 may be moved to various predetermined positions by causing the rotor of motor 315 to revolve through the requisite number of steps in the desired direction. In order to indicate the position of bar 304 and consequently of disc 300, scale 317 is fastened to support 307 and pointer 318 attached to bar 305 is movable relative thereto. Disc 300 is in contact with disc 299 and is movable along a radius thereof to provide different driving ratios therebetween. When disc 300 is near the periphery of disc 299 the latter is driven at its lowest speed and when disc 300 is near the center of disc 299 the latter is driven at its highest speed, assuming a constant speed of motor 312. The spring 297a will keep disc 299 pressed against the edge of disc 300 which may be rounded. These discs may be covered with rubber or other friction-producing material or they may be magnetized or otherwise treated to prevent slippage. Since the load is light there will be less danger of the discs slipping.

Several modes of operation are possible with this arrangement. First, assume that motor 312 is a synchronous motor driving shaft 311 at constant speed. Then as the rotating disc 300 revolves disc 299 and the commutator, current from positive line 49 will pass through brush 319 and the commutator segments 296 to brush 294, intermittently, so that the current will pass through resistor 117 to negative line 86, thereby intermittently applying a positive bias to the grid of tube 115 and causing the thyratrons 77, 78, and 79 to be fired in sequence due to periodic potentials developed across resistor 113 and transmitted to the grids of the thyratrons as described before.

The rate of firing the thyratrons will vary as the rate of rotation of the commutator is varied. This rate is determined by the relative positions of discs 299 and 300 or by the position of pointer 318 relative to scale 317. Step motor 315 may be energized in steps to cause pointer 318 to be set in a predetermined position or manual setting may be employed. It is obvious the screw feeds or the like may be used instead of a rack and pinion. In that case a circular scale may be used.

Since the rotor of motor 28 is rotated at a speed proportional to the rate of firing thyratrons 77, 78, and 79, it is apparent that this motor speed may be determined quite accurately by setting pointer 318 at a desired mark of scale 317, inasmuch as motor 312 is revolving shaft 311 at constant speed. This then provides means for accurately controlling the speed of a large motor by means of a small motor and settable mechanism. There are many industrial and military applications for a motor control system which provides this degree of flexibility and accuracy.

If motor 312 is a step motor, each step movement of this motor can be made to cause any desired number of step movements of motor 28 by setting disc 300 at the proper position relative to disc 299. By choosing the number of commutator segments, the relative number of steps of motors 28 and 312 and the relative diameters of discs 299 and 300, a wide variety of effective step ratios between the motors can be obtained. For instance, one step movement of motor 312 can cause one, two, three, or any number of step movements of motor 28 which may be used for driving any type of mechanism. Further, there may be a reduction of steps if desired. Several step movements of motor 312 can be made to move motor 28 one or more steps. By adjusting the position of disc 300 along disc 299 as indicated by pointer 318 and scale 317, a wide variety of step ratios can be obtained. This system is, in effect, a very flexible variable ratio electrical "gear" drive and may be widely used to provide definite and variable speeds, and variable drive ratios.

For commutator operation, switch 320 connects brush 294 with resistor 117 but if it is desired to use oscillator 321 for firing the thyratrons, switch 320 is connected with contact 322 so that one terminal of the oscillator is connected to resistor 117, the other oscillator terminal being connected to negative line 86 by means of conductor 323. Then, by adjusting frequency control dial 324, the thyratrons may be fired as a result of the oscillator output passing through resistor 117 and the frequency of firing or the speed of motor 28 may be regulated by setting the control dial 324 to the desired frequency. The oscillator output may be rectified if desired.

Box 325, shown connected with step motor 312, houses an equivalent circuit as shown connected with motor 28 but if motor 312 is smaller the thyratrons and other components may be smaller. Positive line 49 may be connected to the circuit in box 325 by closing switch 326 and a terminal of oscillator 321 may likewise be connected to a resistor in box 325 equivalent to resistor 117 by closing switch 327. The other oscillator terminal may remain connected to negative line 86. Then if switch 320 is in the position shown, and switches 326 and 327 are closed, step motor 312 may be controlled in speed by adjusting frequency control dial 324 and so disc 300 will be driven at a desired speed with a step-up or step-down rate of firing thyratrons 77, 78, and 79 as previously described. The speed of motor 28 is therefore controlled by means of oscillator 321 and commutator 296, in combination. The direction of rotation of motor 28 may be reversed by illuminating photocell 120a and simultaneously energizing solenoid 45 and connected relay coil 106a. The direction of rotation of motor 312 may be similarly controlled. If it is desired to drive motor 312 from a source other than the oscillator, switches 326 and 327 may be opened.

What I claim is:

1. In a motor system, a plural phase step motor, means including current distributing means for distributing current to said phases sequentially, variable ratio drive means for actuating said current distributing means at settable predetermined rates, another plural phase step motor for driving said variable ratio drive means, and means for distributing current sequentially to the phases of said other step motor at settable predetermined rates.

2. The device as described in claim 1, said means for distributing current sequentially to the phases of said other step motor at settable predetermined rates including an oscillator.

3. In a motor system, a plural phase step motor, means for preventing rotation of the rotor of said motor through more than a partial step in one direction while allowing substantially free rotation of said rotor in opposite direction, means including current distributing means for distributing current to said phases sequentially, variable ratio drive means for actuating said current distributing means at settable drive ratios, another plural phase step motor for driving a member of said variable ratio drive means, circuit means for distributing current to the phases of said other step motor in sequence, and electrical timing means connected with said circuit means to control the rate of sequential distribution of current to the phases of said other step motor.

References Cited in the file of this patent

UNITED STATES PATENTS

| | | |
|---|---|---|
| 1,254,902 | Hale | Jan. 29, 1918 |
| 1,506,446 | Rogers | Aug. 26, 1924 |
| 2,578,648 | Thomas | Dec. 11, 1951 |
| 2,774,922 | Thomas | Dec. 18, 1956 |